(12) United States Patent
Benn (10) Patent No.: US 10,941,839 B2
(45) Date of Patent: Mar. 9, 2021

(54) HYDRAULIC TENSIONER WITH TUNABLE CHECK VALVE

(71) Applicant: BorgWarner Inc., Auburn Hills, MI (US)

(72) Inventor: Jeremy Benn, Baldwinsville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 298 days.

(21) Appl. No.: 16/158,362

(22) Filed: Oct. 12, 2018

(65) Prior Publication Data

US 2019/0113113 A1    Apr. 18, 2019

Related U.S. Application Data

(60) Provisional application No. 62/571,482, filed on Oct. 12, 2017.

(51) Int. Cl.
| | | |
|---|---|---|
| *F16H 7/08* | (2006.01) | |
| *F16H 7/06* | (2006.01) | |
| *F16K 27/02* | (2006.01) | |

(52) U.S. Cl.
CPC ............... *F16H 7/08* (2013.01); *F16H 7/06* (2013.01); *F16H 7/0848* (2013.01); *F16K 27/0209* (2013.01); *F16H 2007/0806* (2013.01); *F16H 2007/0814* (2013.01); *F16H 2007/0853* (2013.01); *F16H 2007/0859* (2013.01); *F16H 2007/0872* (2013.01); *F16H 2007/0893* (2013.01)

(58) Field of Classification Search
CPC ............... F16H 7/08; F16H 207/0859; F16H 2007/0848; F16H 2007/0853; F16H 2007/0855; F16H 2007/0814; F16H 2007/0806; F16H 2007/0808; F16H 2007/0812; F16H 2007/0891; F16H 2007/0893; F16H 2007/0895; F16H 2007/0897; F16H 2007/0872; F16H 2007/0859
USPC ......................................................... 474/110
See application file for complete search history.

(56) References Cited

U.S. PATENT DOCUMENTS

| | | | | |
|---|---|---|---|---|
| 5,643,117 | A * | 7/1997 | Dembosky | ............ F16H 7/0848 474/110 |
| 5,658,212 | A * | 8/1997 | Meurer | ................. F16H 7/0838 474/110 |

(Continued)

*Primary Examiner* — Michael R Mansen
*Assistant Examiner* — Raveen J Dias
(74) *Attorney, Agent, or Firm* — Burris Law, PLLC (57) ABSTRACT

A hydraulic tensioner can include a valve retainer and valve member within a housing including a cavity, passageway, and boss. The passageway provides fluid communication with the cavity through an end face of the cavity. The boss is disposed about the passageway and extends axially outward from the end face. The valve retainer can include a first plate. The first plate can be fixedly coupled to the housing. The valve member can include a second plate that can be axially between the first plate and the boss. The second plate can extend in a radial direction beyond an outermost edge of the boss. The second plate can move axially between a closed position wherein the second plate is in sealing contact with the boss and an open position wherein the second plate is axially spaced apart from the boss. The valve spring biases the second plate toward the closed position.

20 Claims, 3 Drawing Sheets

(56) References Cited

U.S. PATENT DOCUMENTS

| | | | |
|---|---|---|---|
| 5,700,213 A * | 12/1997 | Simpson | F16H 7/0848 474/110 |
| 5,819,794 A * | 10/1998 | Anderson | F01L 1/02 137/543.17 |
| 6,322,468 B1 * | 11/2001 | Wing | F16H 7/08 474/109 |
| 6,361,458 B1 * | 3/2002 | Smith | F16H 7/0848 474/109 |
| 2002/0006841 A1 | 1/2002 | Simpson et al. | |
| 2002/0160868 A1 | 10/2002 | Wigsten et al. | |
| 2003/0087713 A1 | 5/2003 | Todd et al. | |
| 2003/0125143 A1 | 7/2003 | Seungpyo | |
| 2003/0236144 A1 | 12/2003 | Seungpyo | |
| 2004/0204272 A1 | 10/2004 | Seungpyo et al. | |
| 2004/0266572 A1 * | 12/2004 | Yoshida | F16H 7/0848 474/110 |
| 2005/0049094 A1 | 3/2005 | Seungpyo | |
| 2005/0090342 A1 * | 4/2005 | Yoshida | F16H 7/0836 474/101 |
| 2005/0227799 A1 * | 10/2005 | Yoshida | F16H 7/0848 474/110 |
| 2005/0239589 A1 | 10/2005 | Seungpyo et al. | |
| 2006/0094549 A1 * | 5/2006 | Yoshida | F16H 7/0836 474/110 |
| 2006/0160645 A1 | 7/2006 | Markley et al. | |
| 2006/0270502 A1 | 11/2006 | Markley et al. | |
| 2006/0281594 A1 | 12/2006 | Markley et al. | |
| 2006/0293133 A1 | 12/2006 | Simpson | |
| 2006/0293134 A1 | 12/2006 | Markley et al. | |
| 2006/0293136 A1 | 12/2006 | Markley et al. | |
| 2007/0037647 A1 | 2/2007 | Markley et al. | |
| 2007/0093328 A1 | 4/2007 | Markley | |
| 2007/0119297 A1 | 5/2007 | Mott | |
| 2008/0261737 A1 * | 10/2008 | Yoshida | F16H 7/0836 474/110 |
| 2008/0280712 A1 * | 11/2008 | Ryouno | F16H 7/0848 474/110 |
| 2008/0289703 A1 | 11/2008 | Penzone, Jr. et al. | |
| 2008/0293526 A1 | 11/2008 | Wigsten | |
| 2009/0275430 A1 | 11/2009 | Markley | |
| 2009/0275431 A1 | 11/2009 | Wigsten et al. | |
| 2010/0022339 A1 | 1/2010 | Barve | |
| 2010/0029424 A1 | 2/2010 | Palomaki et al. | |
| 2010/0222167 A1 | 9/2010 | Chekansky et al. | |
| 2011/0015013 A1 * | 1/2011 | Hofmann | F16H 7/0848 474/110 |
| 2011/0077114 A1 | 3/2011 | Markley | |
| 2011/0081997 A1 | 4/2011 | Markely | |
| 2011/0237370 A1 * | 9/2011 | Hartmann | F16H 7/0836 474/110 |
| 2011/0263366 A1 * | 10/2011 | Botez | F16H 7/0848 474/110 |
| 2012/0202629 A1 | 8/2012 | O'Shea | |
| 2013/0109518 A1 * | 5/2013 | Kurematsu | F16H 7/0848 474/110 |
| 2013/0190116 A1 | 7/2013 | Chekansky et al. | |
| 2013/0331214 A1 | 12/2013 | Crump | |
| 2014/0179471 A1 | 6/2014 | Markley et al. | |
| 2014/0187367 A1 | 7/2014 | Todd et al. | |
| 2014/0187368 A1 | 7/2014 | Todd et al. | |
| 2014/0187369 A1 | 7/2014 | Todd et al. | |
| 2015/0240918 A1 * | 8/2015 | Emizu | F16H 7/08 474/110 |
| 2016/0327135 A1 * | 11/2016 | Fischer | F16H 7/0836 |
| 2016/0356365 A1 * | 12/2016 | Crump | F16H 7/0848 |
| 2017/0030434 A1 * | 2/2017 | Kunimatsu | F16H 7/0838 |
| 2018/0363740 A1 * | 12/2018 | Kimura | F16H 7/0848 |
| 2019/0113114 A1 * | 4/2019 | Benn | F16H 7/06 |
| 2019/0128389 A1 * | 5/2019 | Ullein | F16H 7/0834 |
| 2019/0316657 A1 * | 10/2019 | Cobb | F16H 7/08 |
| 2020/0018383 A1 * | 1/2020 | Lu | F15B 13/027 |

* cited by examiner

HYDRAULIC TENSIONER WITH TUNABLE CHECK VALVE

CROSS-REFERENCE TO RELATED APPLICATIONS

This application claims the benefit of U.S. Provisional Patent Application No. 62/571,482 filed Oct. 12, 2017, the disclosure of which is incorporated by reference as if fully set forth in detail herein.

FIELD

The present disclosure relates to hydraulic tensioners that have a tunable check valve.

BACKGROUND

This section provides background information related to the present disclosure which is not necessarily prior art.

Chain drive systems include a drive sprocket and at least one driven sprocket that receives rotary power from the drive sprocket via a flexible, endless chain. One such example of a chain drive system is a chain driven camshaft of an internal combustion engine. Generally, it is important to impart and maintain a certain degree of tension in the chain to prevent noise, slippage, or the unmeshing of teeth in the case of a toothed chain.

Hydraulic tensioners are one type of device typically used to maintain proper chain tension. In general, these mechanisms employ a lever arm that pushes against the chain on the slack side of the power transmission system. This lever arm pushes toward the chain, tightening the chain, when the chain is slack, and retracts away from the chain when the chain tightens. While current hydraulic tensioners are generally suitable for certain applications, there exists a need for improved hydraulic tensioners.

SUMMARY

This section provides a general summary of the disclosure, and is not a comprehensive disclosure of its full scope or all of its features.

In one form, the present disclosure provides for a hydraulic tensioner for a wrapped power transmission device between two rotating members. The hydraulic tensioner can include a housing, a piston, a piston spring, a valve retainer, a valve member, and a valve spring. The housing can include a first cavity, a passageway, and a boss. The first cavity can be disposed about an axis. The passageway can be coupled for fluid communication with the first cavity through a first end face of the first cavity. The boss can be disposed about the axis and about the passageway. The boss can extend axially in an outward direction from the first end face into the first cavity. The piston can be disposed about the axis. An inward end of the piston can be disposed within the first cavity. An outward end of the piston can be external of the housing. The piston can be configured to slide axially relative to the housing. The piston spring can be disposed within the first cavity and can bias the piston in the outward direction. The valve retainer can include a first plate. The first plate can be disposed in the first cavity and can be fixedly coupled to the housing. The valve member can include a second plate. The second plate can be disposed axially between the first plate and the boss. The second plate can extend in a radial direction beyond a radially outermost edge of the boss. The second plate can be configured to move axially between a closed position wherein the second plate is in sealing contact with the boss and an open position wherein the second plate is axially spaced apart from the boss. The valve spring can bias the second plate toward the closed position.

According to a further embodiment, the valve member can include a sidewall that extends axially from the second plate in the outward direction. The sidewall of the valve member can contact the first plate to limit axial travel of the second plate away from the boss.

According to a further embodiment, the sidewall of the valve member can be disposed about the axis and disposed about the valve spring.

According to a further embodiment, the valve spring can contact an inward side of the first plate and an outward side of the second plate.

According to a further embodiment, the piston spring can contact an outward side of the first plate.

According to a further embodiment, the valve retainer can include a sidewall disposed about the axis. The sidewall of the valve retainer can extend axially from the first plate in an inward direction toward the first end face.

According to a further embodiment, the sidewall of the valve retainer can include a plurality of apertures extending radially through the sidewall of the valve retainer.

According to a further embodiment, the first cavity can include a first cylindrical portion and a second cylindrical portion. The first cylindrical portion can have a first diameter. The second cylindrical portion can have a second diameter that is less than the first diameter. The piston can be disposed in the first cylindrical portion and a distal end of the sidewall of the valve retainer can be disposed in the second cylindrical portion.

According to a further embodiment, the second cylindrical portion can define a shoulder that has an outward axial face that is axially offset from the first end face. The distal end of the sidewall of the valve retainer can abut the outward axial face of the shoulder.

According to a further embodiment, the first plate can include an aperture disposed about the axis that extends axially through the first plate.

According to a further embodiment, the second plate can include a metering aperture.

According to a further embodiment, an outer surface of the piston can include a plurality of teeth configured to inhibit inward axial movement of the piston relative to the housing.

In another form, the present disclosure provides for a method of modifying a flow rate of a valve of a hydraulic tensioner. The hydraulic tensioner can include a housing, a piston, a piston spring, a valve retainer, a valve member, and a valve spring. The housing can include a first cavity, a passageway, and a boss. The first cavity can be disposed about an axis. The passageway can be coupled for fluid communication with the first cavity through a first end face of the first cavity. The boss can be disposed about the axis and about the passageway. The boss can extend axially in an outward direction from the first end face into the first cavity. The piston can be disposed about the axis. An inward end of the piston can be disposed within the first cavity. An outward end of the piston can be external of the housing. The piston can be configured to slide axially relative to the housing. The piston spring can be disposed within the first cavity and can bias the piston in the outward direction. The valve retainer can include a first plate. The first plate can be disposed in the first cavity and fixedly coupled to the housing. The valve member can include a second plate. The second plate can be disposed axially between the first plate and the boss. The second plate can extend in a radial direction beyond a radially outermost edge of the boss. The second plate can be configured to move axially between a closed position wherein the second plate is in sealing contact with the boss and an open position wherein the second plate is axially spaced apart from the boss. The valve spring can bias the second plate toward the closed position. The method can include modifying an axial distance between an outward axial face of the boss and the first plate to change a maximum axial travel of the valve member.

According to a further embodiment, the step of modifying the axial distance between the outward axial face of the boss and the first plate can include machining the outward axial face of the boss to decrease an axial distance between the first end face and the outward axial face of the boss.

According to a further embodiment, the valve retainer can include a sidewall disposed about the axis. The sidewall of the valve retainer can extend axially from the first plate in an inward direction toward the first end face and can abut a shoulder that extends axially outward from the first end face. The step of modifying the axial distance between the outward axial face of the boss and the first plate can include machining an outward axial face of the shoulder to decrease an axial distance between the first end face and the outward axial face of the shoulder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
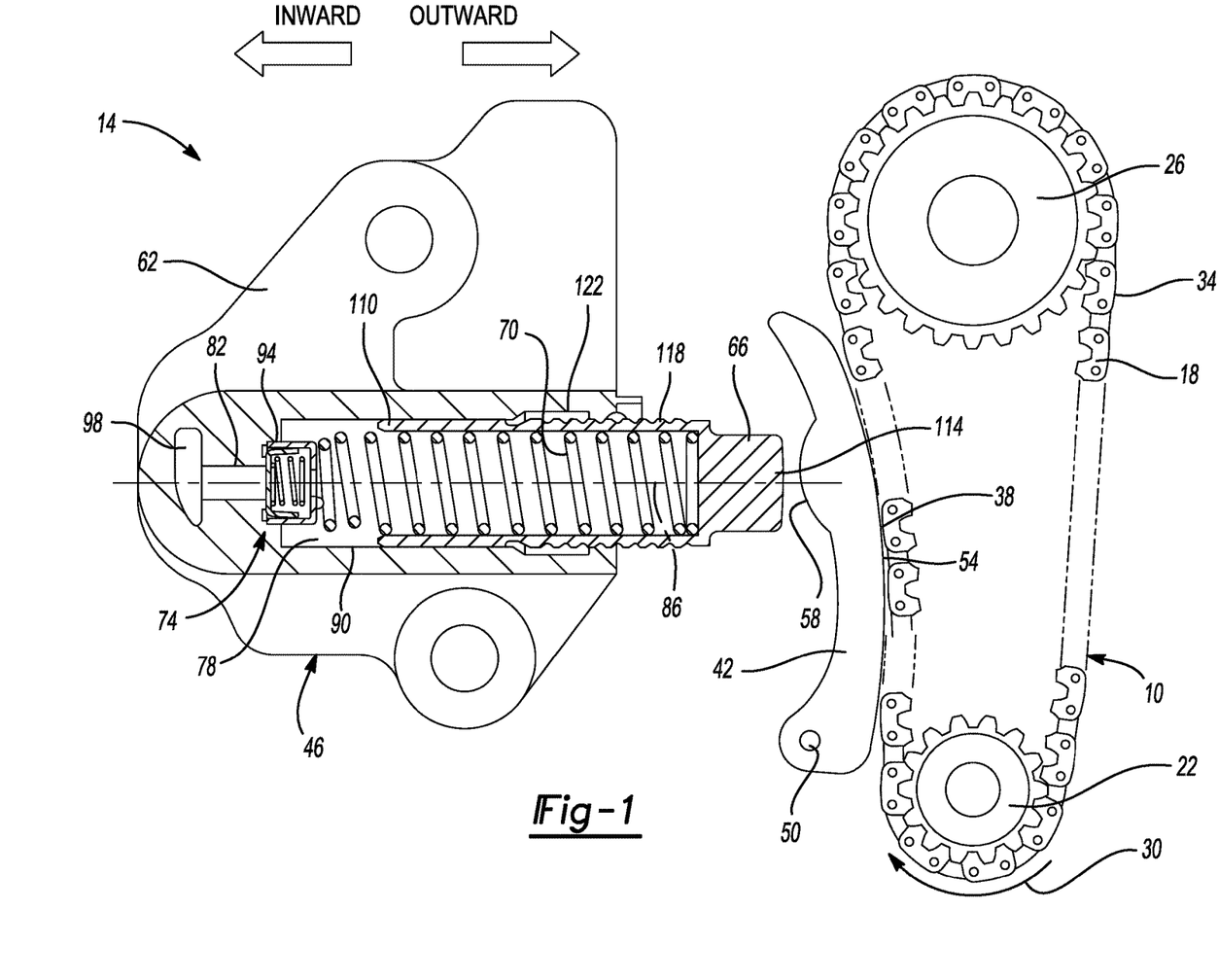
FIG. 1 is a sectional view of a power transmission device including a tensioner in accordance with the present teachings.

With reference to FIG. 1, a power transmission device 10 and a tensioner device 14 are illustrated. The power transmission device 10 can include a chain 18, commonly referred to as an endless chain, a drive sprocket 22, and at least one driven sprocket 26. Thus, the power transmission device is of the type commonly referred to as a wrapped power transmission device. The drive sprocket 22 and driven sprocket 26 are rotating members. While the example illustrated only shows one driven sprocket 26, additional sprockets (e.g., two or more) can be driven by the chain 18. In the example provided, the drive sprocket 22 is coupled to a crankshaft (not shown) of an internal combustion engine (not shown) for common rotation, and the driven sprocket 26 is coupled to a camshaft (not shown) of the engine's valve train (not shown), though other configurations can be used. In the example provided, the drive sprocket 22 rotates in the clockwise direction as illustrated by arrow 30, such that the chain has a tension side 34 and a slack side 38 relative to the drive and driven sprockets 22, 26. The chain 18 and sprockets 22, 26 can be configured in any suitable compatible manner known in the art, such as roller chains and sprockets having corresponding teeth that extend radially outward for example.

The tensioner device 14 can include a lever arm 42 and a tensioner 46. Those of skill in the art will appreciate that the tensioner 46 and lever arm 42 of FIG. 1 are not necessarily drawn to scale with relation to the power transmission device 10 and the power transmission device 10 may be different in size relative to the tensioner 46 and lever arm 42. The lever arm 42 can be mounted on a pivot 50. The pivot 50 can be fixed relative to the engine (not shown) such that its position can be fixed relative to the power transmission device 10. For example, the pivot 50 can be fixed to the engine block (not specifically shown), a rigid portion of the body (not shown) or frame (not shown), the transmission (not shown), or another structure (not shown) having a position fixed relative to the power transmission device 10. The lever arm 42 can be pivotably coupled to the pivot 50 such that the lever arm 42 can rotate or pivot about the pivot 50. The lever arm 42 can have a first side 54 that can engage an outer portion of the slack side 38 of the chain 18, e.g., between the sprockets 22, 26. The lever arm 42 can have a second side 58 that is opposite the first side 54.

The tensioner 46 can include a housing 62, a plunger or piston 66, a piston spring 70, and a valve assembly 74. The housing 62 can be fixedly coupled to the engine (not shown), a rigid portion of the body (not shown) or frame (not shown), the transmission (not shown), or another structure (not shown) having a position fixed relative to the power transmission device 10 and the pivot 50. The housing 62 can define a first cavity 78 and a fluid passageway 82. The first cavity 78 can be a generally cylindrically shaped bore, disposed about a central axis 86, and can have a first cylindrical portion 90 and a valve recess 94. The first cylindrical portion 90 can have one end open through a side of the housing 62 that faces toward the power transmitting device 10. The opposite end of the first cylindrical portion 90 can be open to the valve recess 94. The fluid passageway 82 can couple the valve recess 94 with a reservoir 98 for fluid communication therebetween.

The reservoir 98 can be configured to hold a volume of fluid at an elevated pressure. The reservoir 98 can be separate from the housing 62 and coupled to the fluid passageway 82 for fluid communication therewith, or can be integrally formed in the housing 62. The reservoir 98 can receive pressurized fluid from a pressure source, such as a pump (not specifically shown) so that the fluid in the reservoir 98 can be maintained at a predetermined pressure. In the example provided, the pump (not shown) can be driven directly or indirectly by the crankshaft (not specifically shown), though other configurations can be used (e.g., an electric pump).

The piston 66 can be a generally hollow cylindrical body that can have an open end 110 and a closed end 114. The piston can be coaxial with the central axis 86 and disposed partially within the first cylindrical portion 90 such that the open end 110 is within the first cavity 78 and open into the first cavity 78 for fluid communication therewith. The piston 66 can extend through the open end of the first cylindrical portion 90 such that the closed end 114 of the piston 66 can be disposed external of the housing 62. The closed end 114 of the piston 66 can engage the second side 58 of the lever arm 42. The piston 66 can be axially slidable within the first cylindrical portion 90 and can be in sealing relation with the housing 62 such that the piston 66 closes the open end of the first cylindrical portion 90. In the example provided, an outer cylindrical surface of the piston 66 is in sealing engagement with an inner surface of the first cylindrical portion 90, though other configurations can be used, such as O-rings or other seals (not specifically shown) for example.

An outer surface of the piston 66 proximate to the closed end 114 can include a plurality of ratchet teeth 118 that can engage a ratchet retaining member (not specifically shown), such as a spring c-clip disposed in a recess 122 in the housing 62 proximate to the open end of the first cylindrical portion 90. The ratchet retaining member (not shown) can engage the ratchet teeth 118 in a ratcheting manner, such that the piston 66 can move in the outward direction from the first cavity 78, while inhibiting the piston 66 from moving in the opposite, inward direction. The teeth 118 and retaining member (not shown) can be configured such that a small amount of movement (e.g., approximately 0-4 mm) in the inward direction may be possible before the teeth 118 and retaining member (not shown) engage to inhibit further inward movement. This small amount of movement in the inward direction before the teeth 118 engage the retaining member (not shown) can be referred to as "bang-lash".

The piston spring 70 can be disposed within the first cavity 78 and configured to bias the piston 66 axially in the outward direction (e.g., toward the power transmitting device 10 and into contact with the lever arm 42). In the example provided, the piston spring 70 is a coiled compression spring disposed coaxially about the central axis 86. The piston spring 70 can extend through the open end 110 of the piston 66 such that one end of the piston spring 70 is disposed within the piston 66 and the other end of the piston spring 70 is disposed outside the piston 66 within the first cavity 78.

Figure 2:
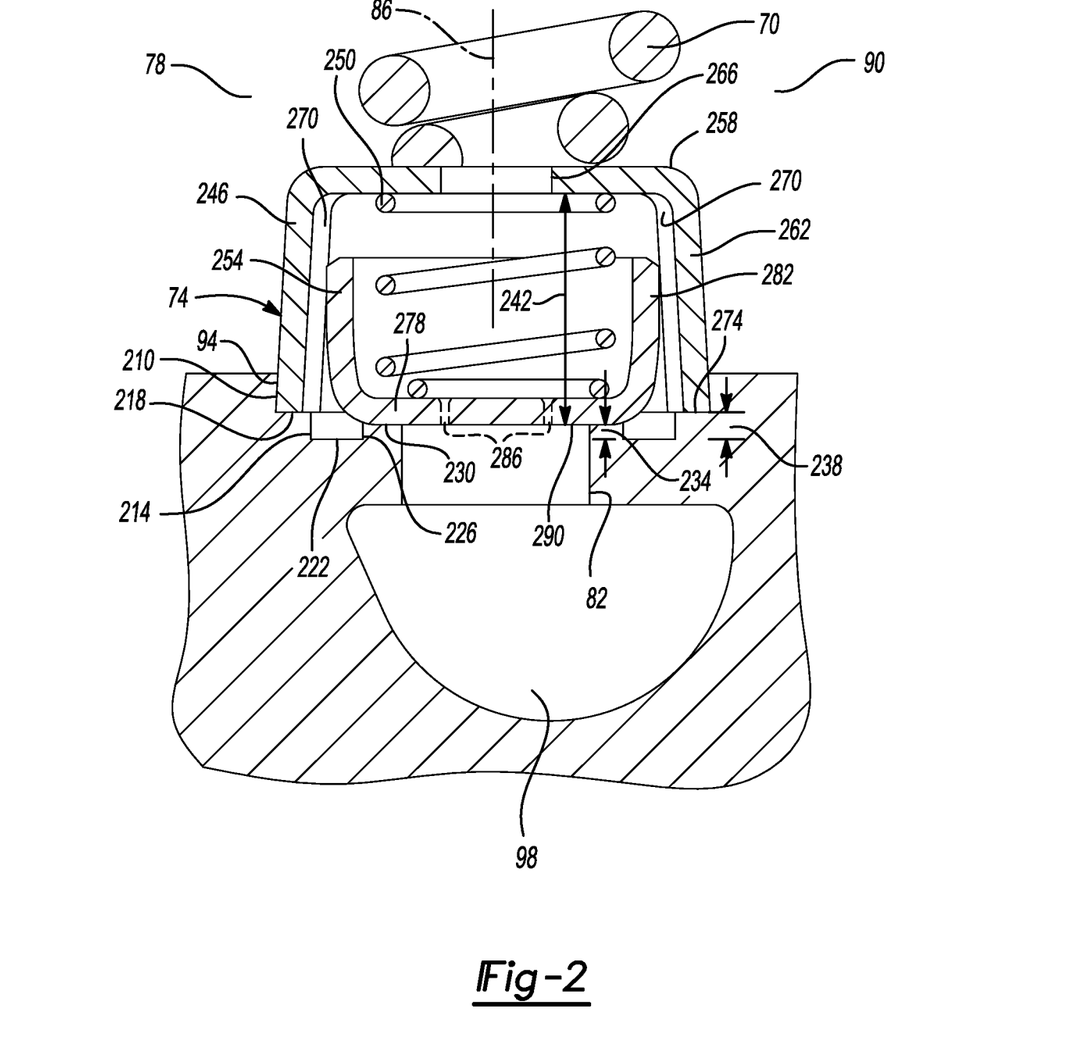
FIG. 2 is a sectional view of a portion of the tensioner of FIG. 1, illustrating a valve of the tensioner of a first construction.

With additional reference to FIG. 2, the valve recess 94 can be coaxial with the central axis 86. In the example provided the valve recess 94 can include a second cylindrical portion 210 and a third cylindrical portion 214. The second cylindrical portion 210 can be open toward the first cylindrical portion 90 of the first cavity 78. In the example provided, the second cylindrical portion 210 can have a diameter that is less than a diameter of the first cylindrical portion 90. In other words, in the example provided the first cavity 78 steps down in diameter from the first cylindrical portion 90 to the second cylindrical portion 210.

The third cylindrical portion 214 can be open to the second cylindrical portion 210 and the fluid passageway 82, such that the third cylindrical portion 214 is axially between the second cylindrical portion 210 and the fluid passageway 82. In the example provided, the third cylindrical portion 214 can have a diameter that is less than the diameter of the second cylindrical portion 210. In other words, in the example provided the first cavity 78 steps down in diameter from the second cylindrical portion 210 to the third cylindrical portion 214, such that the step down in diameter therebetween can define a shoulder 218. In an alternative configuration, not specifically shown, the second cylindrical portion 210 can be the same diameter as the third cylindrical portion 214.

In the example provided, the fluid passageway 82 can be coaxial with the central axis 86 and extend through an axial end face 222 of the third cylindrical portion 214. In the example provided, the fluid passageway 82 is, in part, defined by a cylindrical protrusion or boss 226 of the housing 62 that can extend axially in the outward direction into the third cylindrical portion 214 from the end face 222. The boss 226 can extend from the end face 222 to a distal end 230 of the boss 226 by a first axial distance 234. In the example provided, the end face 222 can be offset a second axial distance 238 from the shoulder 218. In the example provided, the distal end 230 of the boss 226 can be axially inward of the shoulder 218. The distal end 230 of the boss 226 can be generally flat and perpendicular to the central axis 86. In the example provided, the distal end 230 has a circular annular shape.

The valve assembly 74 can include a check valve retainer 246, a check valve spring 250, and a check valve cup member 254. The check valve retainer 246 can include a first plate 258 and a first sidewall 262. The first plate 258 can be a disk shape generally coaxial with the central axis 86 and can include an aperture 266. In the example provided, the aperture 266 can be coaxial with the central axis 86 and the first plate 258 can be disposed within the first cylindrical portion 90 of the first cavity 78. The first sidewall 262 can be a generally cylindrical body disposed coaxially about the central axis 86 and can extend axially in the inward direction from the first plate 258 toward the end face 222. The first sidewall 262 can include a plurality of side apertures 270 that extend radially through the first sidewall 262. In the example provided, the side apertures 270 are slits that extend longitudinally generally parallel to the central axis 86, though other configurations can be used, such as holes or other shapes for example.

A distal end 274 of the first sidewall 262 (i.e., the end opposite the first plate 258) can have an outer diameter that can be received in the second cylindrical portion 210. In the example provided, the outer diameter of the first sidewall 262 is such that the first sidewall 262 is press-fit into the second cylindrical portion 210. The distal end 274 can have an inner diameter that can be radially outward of the boss 226. In the example provided, the inner diameter of the distal end 274 can be radially outward of the third cylindrical portion 214 such that the distal end 274 can be disposed on and abut against the shoulder 218. Thus, the distal end 230 of the boss 226 can be offset a third axial distance 242 from the first plate 258. In the example provided, the inward end of the piston spring 70 can abut against a side of the first plate 258 that faces in the outward direction such that the piston spring 70 and shoulder 218 can retain the check valve retainer 246 axially.

The check valve cup member 254 can be disposed between the boss 226 and the first plate 258 and radially within the first sidewall 262. The check valve cup member 254 can be configured to move axially relative to the check valve retainer 246 between a closed position (shown in FIG. 2) and an open position (not specifically shown) wherein the check valve cup member 254 is axially spaced apart from the boss 226. In the example provided, the check valve cup member 254 can include a second plate 278 and a second sidewall 282.

In the example provided, the second plate 278 can be a disk shape and may include one or more metering apertures 286 that extend axially through the second plate 278 and have relatively small diameters such that they allow only a small flowrate of fluid through the second plate 278. For example, the metering apertures 286 can be laser cut pinholes such that a maximum flow rate through the metering apertures 286 is significantly less than the flow rate through the fluid passageway 82, aperture 266 of the first plate 258, and the side apertures 270. In the example provided, the second plate 278 includes a plurality of the metering apertures 286. The metering apertures 286 can be aligned with the fluid passageway 82 such that fluid flowing through the metering apertures 286 can flow directly into the fluid passageway 82.

The second plate 278 can have an outermost diameter that is greater than the outer diameter of the boss 226, but is less than the inner diameter of the shoulder 218 (i.e., less than the outermost diameter of the third cylindrical portion 214). The second sidewall 282 can be a generally cylindrical shape disposed about the central axis 86 that extends axially in the outward direction from the second plate 278. The end of the second sidewall 282 that is distal to the second plate 278 can be radially outward of the aperture 266 of the first plate 258.

When the check valve cup member 254 is in the closed position, an axially inward facing surface 290 of the second plate 278 can contact and seal with the distal end 230 of the boss 226 to inhibit fluid communication between the first cavity 78 and the reservoir 98 through the fluid passageway 82. Since the outer diameter of the boss 226 is less than the outer diameter of the inward facing surface 290 of the second plate 278, the inward facing surface 290 can form a more consistent and full seal even if the distal end 230 of the boss 226 or the inward facing surface 290 are not perfectly flat, such as due to manufacturing tolerances and/or wear of the parts. Thus, the boss 226 can provide a better sealing surface than if the second plate 278 were to contact the end face 222 directly.

As described above, when the second plate 278 includes the metering apertures 286, some minor fluid flow can still pass through the metering apertures 286 to the fluid passageway 82 when the check valve cup member 254 is in the closed position. When the check valve cup member 254 is in the open position, the inward facing surface 290 can be axially spaced apart from the distal end 230 of the boss 226 such that fluid communication is permitted through the fluid passageway 82.

The check valve spring 250 can be disposed axially between the first plate 258 and the second plate 278 and can bias the second plate 278 toward the boss 226 (i.e., toward the closed position). In the example provided, the check valve spring 250 is a compression coil spring that can be coiled to have a diameter that is greater than the aperture 266 in the first plate 258, but less than the inner diameter of the second sidewall 282. Thus, the check valve spring 250 can be seated within the second sidewall 282 and be generally coaxial with the central axis 86. The check valve spring 250 can contact the outward side of the second plate 278 and the inward side of the first plate 258.

During nominal operation, the check valve cup member 254 is in the closed position. When the piston 66 is pushed in the inward direction by the lever arm 42, such as during bang-lash, the piston 66 can compress the fluid in the first cylindrical portion 90 to be a pressure greater than the pressure in the reservoir 98. When the piston 66 is pushed in the outward direction (e.g., by the piston spring 70), such as to take up slack in the chain 18, the pressure in the first cylindrical portion 90 can drop below the pressure in the reservoir 98.

Small increases in the pressure in the first cylindrical portion 90 (e.g., due to small movements or relatively slow movement of the piston 66 in the inward direction) can cause fluid to flow through the metering apertures 286 toward the reservoir 98 via the fluid passageway 82. Likewise, small decreases in the pressure in the first cylindrical portion 90 (e.g., due to small movements or relatively slow movement of the piston 66 in the outward direction) can cause fluid to flow through the metering apertures 286 into the first cylindrical portion 90. These small pressures can be such that the force created on the second plate 278 at the fluid passageway 82 does not overcome the spring force of the check valve spring 250 and does not move the check valve cup member 254 toward the open position.

Larger movements or faster movement of the piston 66 in the inward direction can cause the fluid pressure to increase in the first cavity 78 faster than pressure can be released through the metering apertures 286. Thus, the second plate 278 acts as a check valve to prevent or limit fluid flow from the first cavity 78 to the reservoir 98, thus resisting axial movement of the piston 66 in the inward direction.

Larger decreases in pressure in the first cylindrical portion 90 (e.g., due to larger movements or faster movement of the piston 66 in the outward direction) can cause the fluid to exert a force in the outward direction on the second plate 278 (e.g., through the fluid passageway 82) that can overcome the force of the check valve spring 250 and can move the check valve cup member 254 toward the open position. As such, when the pressure differential between the first cylindrical portion 90 and the reservoir 98 decreases below a predetermined pressure differential (e.g., corresponding to the spring force of the check valve spring 250), the second plate 278 can move away from the distal end 230 of the boss 226 to permit fluid to flow from the fluid passageway 82 into the first cylindrical portion 90. This predetermined pressure can be called the "pop-up pressure".

The distal end of the second sidewall 282 can contact the inward side of the first plate 258 to prevent further axial movement of the second plate 278 in the outward direction. The maximum separation of the second plate 278 from the distal end 230 of the boss 226 can impact the maximum flowrate between the first cavity 78 and the fluid passageway 82. The pop-up pressure as well as the maximum separation between the second plate 278 and the boss 226 can depend on the third axial distance 242 (i.e., the distance between the distal end 230 of the boss 226 and the first plate 258), since the compression of the check valve spring 250 as well as the distance between the distal end of the second sidewall 282 and the first plate 258 can change based on the third axial distance 242. Accordingly, different pop-up pressures and/or maximum flow rates can be achieved by varying the height of the boss 226 relative to the position of the first plate 258.

One way to adjust this relative position (i.e., the third axial distance 242) from one part to the next part (e.g., for different applications or vehicles) during the manufacturing process is to change the distance between the distal end 230 of the boss 226 and the end face 222 of the third cylindrical portion 214 (i.e., to change the first axial distance 234), while maintaining the second axial distance 238. For example, this can be achieved by machining the distal end 230 of the boss 226. Thus, the dimensions and physical properties of the check valve retainer 246, the check valve cup member 254, the check valve spring 250, and the piston spring 70 can be maintained between parts having different pop-up pressures and/or maximum flowrates. The standardization of these parts can reduce manufacturing costs and time while still allowing for different pop-up pressures and/or maximum flowrates for different applications.

Figure 3:
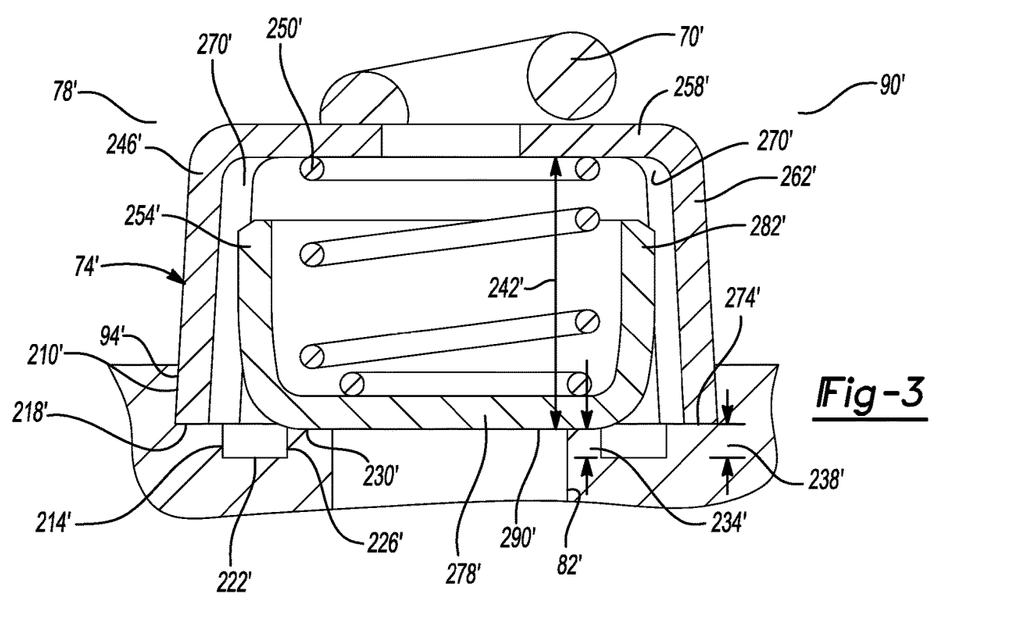
FIG. 3 is a sectional view similar to FIG. 2, illustrating a tensioner of a second construction.

For example, FIG. 3 illustrates a portion of a tensioner 46' of a second construction. The tensioner 46' can be similar to the tensioner 46, except as otherwise shown or described herein. Accordingly, primed reference numerals indicate elements similar to those shown in FIGS. 1 and 2 and described above with reference to similar, but non-primed reference numerals. In the example provided, the first axial distance 234' is greater than the first axial distance 234 (FIG. 2). Thus, the tensioner 46' can have a greater pop-up pressure and can have a lower maximum flowrate than the tensioner 46 (FIGS. 1 and 2).

Figure 4:
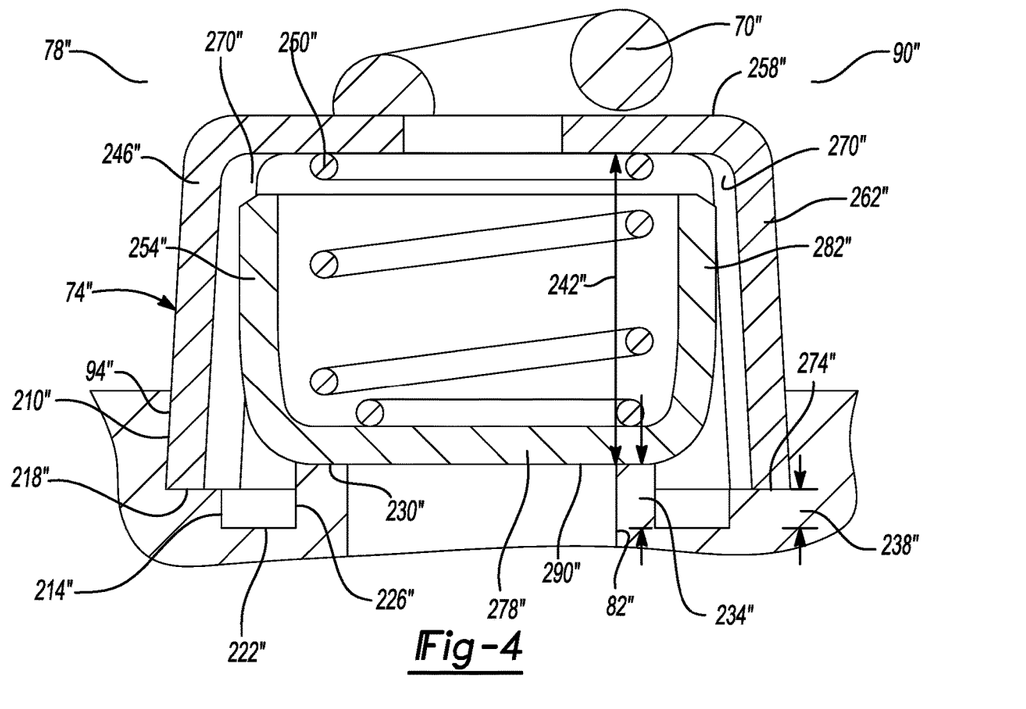
FIG. 4 is a sectional view similar to FIG. 2, illustrating a tensioner of a third construction.

By way of another example, FIG. 4 illustrates a tensioner 46" of a third construction. The tensioner 46" can be similar to the tensioner 46, except as otherwise shown or described herein. Accordingly, double primed reference numerals indicate elements similar to those shown in FIGS. 1 and 2 and described above with reference to similar, but non-primed reference numerals. In the example provided, the first axial distance 234" is greater than the first axial distance 234 (FIG. 2) and also greater than the first axial distance 234' (FIG. 3). Thus, the tensioner 46" can have a greater pop-up pressure and can have a lower maximum flowrate than both the tensioners 46 and 46' (FIGS. 1-3).

Thus, one example of a method of manufacturing tensioner devices having different pop-up pressures and/or maximum flow rates, or modifying a tensioner device to change its pop-up pressure and/or maximum flow rate, can include the step of machining the distal end 230 of the boss 226 from a first predetermined height that corresponds to a first pop-up pressure and/or first flow rate, to a second predetermined height that is less than the first predetermined height and corresponds to a second pop-up pressure and/or second flow rate.

Another way to adjust this relative position (i.e., the third axial distance 242) from one part to the next part (e.g., for different applications or vehicles) during the manufacturing process is to change the distance between the shoulder 218 and the end face 222 of the third cylindrical portion 214 (i.e., to change the second axial distance 238), while maintaining the first axial distance 234. For example, this can be achieved by machining the shoulder 218. Thus, the dimensions and physical properties of the check valve retainer 246, the check valve cup member 254, and the check valve spring 250 can be maintained between parts having different pop-up pressures and/or maximum flowrates. In some applications, the piston spring 70 can also be maintained between parts, since the change in positioning of the first plate 258 relative to the housing 62 between different parts can be negligible relative to the size and stiffness of the piston spring 70 and designed travel of the piston 66. Again, the standardization of these parts can reduce manufacturing costs and time while still allowing for different pop-up pressures and/or maximum flowrates for different applications.

Thus, another example of a method of manufacturing tensioner devices having different pop-up pressures and/or maximum flow rates, or modifying a tensioner device to change its pop-up pressure and/or maximum flow rate, can include the step of machining the shoulder 218 from a first predetermined height that corresponds to a first pop-up pressure and/or first flow rate, to a second predetermined height that is less than the first predetermined height and corresponds to a second pop-up pressure and/or second flow rate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A hydraulic tensioner for an endless power transmitting element, the hydraulic tensioner comprising:
   a housing that defines a first cavity, a first counterbore, an end wall, and a passageway, the first cavity being disposed about an axis and having a first end, which intersects an exterior surface of the housing, and a second end, the first counterbore intersecting the second end of the first cavity, the end wall being disposed radially inwardly of the first counterbore, the passageway being formed through the end wall and being in fluid communication with the first cavity;
   a piston received in the first cavity and extending from the exterior surface of the housing, the piston being movable along the axis relative to the housing;
   a piston spring disposed in the first cavity and biasing the piston in a direction away from the second end of the first cavity;
   a valve retainer having a first plate, the valve retainer being received in the first counterbore and fixedly coupled to the housing;
   a valve member having a second plate that is disposed along the axis between the first plate and the end wall, the second plate extending in a radial direction beyond a radially outermost edge of the end wall, the second plate being configured to move along the axis between a closed position, in which the second plate is abutted against the end wall, and an open position in which the second plate is axially spaced apart from the end wall; and
   a valve spring biasing the second plate toward the closed position;
   wherein the valve member includes a sidewall that extends axially from the second plate away from the end wall, wherein the sidewall of the valve member is configured to contact the first plate to limit axial travel of the second plate away from the end wall;
   wherein the valve retainer includes a sidewall that extends along the axis into the first counterbore;
   wherein the housing defines an annular channel that is disposed radially inward of the first counterbore, and wherein the end wall is disposed radially inward of the annular channel; and
   wherein the first counterbore defines a shoulder wherein the shoulder is spaced apart from the end wall along the axis by a predetermined distance.

2. The hydraulic tensioner of claim 1, wherein the sidewall of the valve member is disposed about the valve spring.

3. The hydraulic tensioner of claim 2, wherein the valve spring contacts both the first plate and the second plate.

4. The hydraulic tensioner of claim 3, wherein the piston spring contacts the first plate.

5. The hydraulic tensioner of claim 1, wherein a plurality of apertures are formed through the sidewall of the valve retainer.

6. The hydraulic tensioner of claim 1, wherein one or more apertures are formed through the first plate.

7. The hydraulic tensioner of claim 1, wherein one or more metering apertures are formed through the second plate.

8. The hydraulic tensioner of claim 1, wherein a plurality of teeth are formed on an outer circumferential surface of the piston.

9. The hydraulic tensioner of claim 1, wherein the sidewall of the valve member is disposed about the axis and disposed about the valve spring.

10. The hydraulic tensioner of claim 9, wherein the valve spring contacts an inward side of the first plate and an outward side of the second plate.

11. The hydraulic tensioner of claim 10, wherein the piston spring contacts an outward side of the first plate.

12. A method of modifying a flow rate of a valve of a hydraulic tensioner, the hydraulic tensioner including: a housing including a first cavity, a passageway, and a boss, the first cavity being disposed about an axis, the passageway being coupled for fluid communication with the first cavity through a first end face of the first cavity, the boss being disposed about the axis and about the passageway, the boss extending axially in an outward direction from the first end face into the first cavity; a piston disposed about the axis, an inward end of the piston being disposed within the first cavity, an outward end of the piston being external of the housing, the piston being configured to slide axially relative to the housing; a piston spring disposed within the first cavity and biasing the piston in the outward direction; a valve retainer including a first plate, the first plate being disposed in the first cavity and fixedly coupled to the housing; a valve member including a second plate, the second plate being disposed axially between the first plate and the boss, the second plate extending in a radial direction beyond a radially outermost edge of the boss, the second plate being configured to move axially between a closed position wherein the second plate is in sealing contact with the boss and an open position wherein the second plate is axially spaced apart from the boss; and a valve spring biasing the second plate toward the closed position; the method comprising:
   modifying an axial distance between an outward axial face of the boss and the first plate to change a maximum axial travel of the valve member;
   wherein the valve retainer includes a sidewall disposed about the axis, the sidewall of the valve retainer extending axially from the first plate in an inward direction toward the first end face and abutting a shoulder that extends axially outward from the first end face, and wherein the step of modifying the axial distance between the outward axial face of the boss and the first plate includes: machining an outward axial face of the shoulder to decrease an axial distance between the first end face and the outward axial face of the shoulder.

13. The method of claim 12, wherein the step of modifying the axial distance between the outward axial face of the boss and the first plate includes: machining the outward axial face of the boss to decrease an axial distance between the first end face and the outward axial face of the boss.

14. A hydraulic tensioner for a wrapped power transmission device between two rotating members, the hydraulic tensioner comprising:
   a housing including a first cavity, a passageway, and a boss, the first cavity being disposed about an axis, the passageway being coupled for fluid communication with the first cavity through a first end face of the first cavity, the boss being disposed about the axis and about the passageway, the boss extending axially in an outward direction from the first end face into the first cavity;

a piston disposed about the axis, an inward end of the piston being disposed within the first cavity, an outward end of the piston being external of the housing, the piston being configured to slide axially relative to the housing;

a piston spring disposed within the first cavity and biasing the piston in the outward direction;

a valve retainer including a first plate, the first plate being disposed in the first cavity and fixedly coupled to the housing;

a valve member including a second plate, the second plate disposed axially between the first plate and the boss, the second plate extending in a radial direction beyond a radially outermost edge of the boss, the second plate being configured to move axially between a closed position wherein the second plate is in sealing contact with the boss and an open position wherein the second plate is axially spaced apart from the boss; and a valve spring biasing the second plate toward the closed position;

wherein the valve member includes a sidewall that extends axially from the second plate in the outward direction, wherein the sidewall of the valve member is configured to contact the first plate to limit axial travel of the second plate away from the boss; and wherein the second plate includes a metering aperture.

15. The hydraulic tensioner of claim 14, wherein the valve retainer includes a sidewall disposed about the axis, the sidewall of the valve retainer extending axially from the first plate in an inward direction toward the first end face.

16. The hydraulic tensioner of claim 15, wherein the sidewall of the valve retainer includes a plurality of apertures extending radially through the sidewall of the valve retainer.

17. The hydraulic tensioner of claim 15, wherein the first cavity includes a first cylindrical portion and a second cylindrical portion, the first cylindrical portion having a first diameter, the second cylindrical portion having a second diameter that is less than the first diameter, wherein the piston is disposed in the first cylindrical portion and a distal end of the sidewall of the valve retainer is disposed in the second cylindrical portion.

18. The hydraulic tensioner of claim 17, wherein the second cylindrical portion defines a shoulder that has an outward axial face that is axially offset from the first end face, wherein the distal end of the sidewall of the valve retainer abuts the outward axial face of the shoulder.

19. The hydraulic tensioner of claim 14, wherein the first plate includes an aperture disposed about the axis that extends axially through the first plate.

20. The hydraulic tensioner of claim 14, wherein an outer surface of the piston includes a plurality of teeth configured to inhibit inward axial movement of the piston relative to the housing.

* * * * *